United States Patent
Wang

(10) Patent No.: US 11,401,471 B2
(45) Date of Patent: Aug. 2, 2022

(54) SIMULATED DISTILLATION USING GAS CHROMATOGRAPHY WITH VACUUM ULTRAVIOLET DETECTION

(71) Applicant: ExxonMobil Technology and Engineering Comapny, Annandale, NJ (US)

(72) Inventor: Frank C. Wang, Annandale, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 208 days.

(21) Appl. No.: 16/704,278

(22) Filed: Dec. 5, 2019

(65) Prior Publication Data
US 2020/0199458 A1    Jun. 25, 2020

Related U.S. Application Data

(60) Provisional application No. 62/781,809, filed on Dec. 19, 2018, provisional application No. 62/781,800, filed on Dec. 19, 2018.

(51) Int. Cl.
| | |
|---|---|
| *C10G 7/12* | (2006.01) |
| *B01D 53/02* | (2006.01) |
| *G01N 30/74* | (2006.01) |
| *G01N 30/68* | (2006.01) |
| *G01N 30/86* | (2006.01) |
| G01N 30/64 | (2006.01) |
| G01N 30/72 | (2006.01) |

(52) U.S. Cl.
CPC .............. *C10G 7/12* (2013.01); *B01D 53/025* (2013.01); *G01N 30/68* (2013.01); *G01N 30/74* (2013.01); *G01N 30/8606* (2013.01); *G01N 30/8675* (2013.01); *B01D 2256/24* (2013.01); *C10G 2300/301* (2013.01); *G01N 30/7213* (2013.01); *G01N 2030/642* (2013.01); *G01N 2030/746* (2013.01)

(58) Field of Classification Search
None
See application file for complete search history.

(56) References Cited

U.S. PATENT DOCUMENTS

| | | | | |
|---|---|---|---|---|
| 4,865,746 A | * | 9/1989 | Overfield | G01N 30/88 210/656 |
| 4,988,446 A | * | 1/1991 | Haberman | G01N 30/461 210/656 |

FOREIGN PATENT DOCUMENTS

WO    WO 2011/103042    *    8/2011

* cited by examiner

*Primary Examiner* — Daniel S Larkin
(74) *Attorney, Agent, or Firm* — Vorys, Sater, Seymour and Pease LLP

(57) ABSTRACT

A method to simulate distillation of a petroleum stream by gas chromatography can include separating the petroleum stream with a gas chromatograph as a function of boiling point; passing the separated petroleum stream through a vacuum ultraviolet detector to yield data comprising a vacuum ultraviolet signal as a function of boiling point; integrating the vacuum ultraviolet signal as a function of boiling point over two or more wavelength ranges to derive relative concentrations of two or more components of the separated petroleum stream that correspond to the two or more wavelength ranges.

20 Claims, 8 Drawing Sheets

SIMULATED DISTILLATION USING GAS CHROMATOGRAPHY WITH VACUUM ULTRAVIOLET DETECTION

CROSS REFERENCE TO RELATED APPLICATIONS

This application relates and claims priority to US Provisional Patent Application No. 62/781,800 and U.S. Provisional Patent Application No. 62/781,809, both filed on Dec. 19, 2018, which are both incorporated herein specifically by reference in their entireties.

BACKGROUND

The present invention relates to the characterization of petroleum streams.

Since distillation is a fundamental separation process for the petroleum refining industry, it is essential to be able to characterize petroleum streams (e.g., crude oil streams or refinery streams) based on its boiling behavior in the refinery units. Lab scale distillations are relatively slow and costly. Thus, simulated distillation by gas chromatography (GC) has been widely used in the petroleum industry to predict boiling yield. It is an important tool to provide information for parameter setting of the distillation process during refining.

GC Simulated Distillation as currently practiced in prior art uses a non-polar column that elutes the molecules based on boiling temperature and a flame ionization detector (FID), a general purpose detector that for hydrocarbons yields a signal proportional to mass. No chemical information is directly measured. There is a need to provide additional chemical information about the molecules in the crude oil or refinery stream.

SUMMARY

The present invention relates to the characterization of petroleum streams with GC Simulated Distillation enhanced with vacuum ultraviolet (VUV) detection.

A nonlimiting example embodiment of the present invention is a method to simulate distillation of a petroleum stream by gas chromatography, the method comprising: separating the petroleum stream with a gas chromatograph as a function of boiling point; passing the separated petroleum stream through a vacuum ultraviolet detector to yield data comprising a vacuum ultraviolet signal as a function of boiling point; integrating the vacuum ultraviolet signal as a function of boiling point over two or more wavelength ranges to derive relative concentrations of two or more components of the separated petroleum stream that correspond to the two or more wavelength ranges. Optionally, a portion of the petroleum stream can also be passed through one of the following detectors for additional analysis: a flame ionization detector, a mass spectrometer, an atomic emission detector, a chemiluminescence detector, a photoionization detector, a field ionization mass spectrometer, and an electron impact mass spectrometer.

Another nonlimiting example embodiment of the present invention is a method to simulate distillation of a petroleum stream by gas chromatography, the method comprising: separating the petroleum stream with a gas chromatograph as a function of boiling point; passing a first portion of the separated petroleum stream through a vacuum ultraviolet detector to yield data comprising a vacuum ultraviolet signal as a function of boiling point; passing a second portion of the separated petroleum stream through a flame ionization detector (FID) to yield data comprising a FID response as a function of boiling point; integrating the vacuum ultraviolet signal as a function of boiling point over two or more wavelength ranges to derive relative concentrations of two or more components of the separated petroleum stream that correspond to the two or more wavelength ranges; integrating the FID response as a function of boiling point over to derive weight percent of the separated petroleum stream as a function of boiling point; and correlating the relative concentrations of two or more components of the separated petroleum stream with the weight percent of the separated petroleum stream as a function of boiling point. Optionally, a portion of the petroleum stream can also be passed through one of the following detectors for additional analysis: a mass spectrometer, an atomic emission detector, a chemiluminescence detector, a photoionization detector, a field ionization mass spectrometer, and an electron impact mass spectrometer.

The foregoing methods can be useful in further performing one or more of: determining a reactivity of the petroleum stream based on the relative concentrations of the two or more components in the one or more fractions of the petroleum stream; determining an oxidation stability of the petroleum stream based on the relative concentrations of the two or more components in the one or more fractions of the petroleum stream; determining a solubility of the petroleum stream in a solvent comprising one or more organic solvents based on the relative concentrations of the two or more components in the one or more fractions of the petroleum stream; determining a solubility of the petroleum stream in a solvent comprising one or more inorganic solvents based on the relative concentrations of the two or more components in the one or more fractions of the petroleum stream; determining a solubility of the petroleum stream in a solvent comprising one or more organic solvents and one or more inorganic solvents based on the relative concentrations of the two or more components in the one or more fractions of the petroleum stream; determining a compatibility of the petroleum stream with other crude oils based on the relative concentrations of the two or more components in the one or more fractions of the petroleum stream; determining a compatibility of the petroleum stream with other refinery streams based on the relative concentrations of the two or more components in the one or more fractions of the petroleum stream; determining a compatibility of the petroleum stream with other crude oils and other refinery streams based on the relative concentrations of the two or more components in the one or more fractions of the petroleum stream; distilling a petroleum feedstock corresponding to the petroleum stream with distillation cut point temperatures based on the relative concentrations of the two or more components in the one or more fractions of the petroleum stream; and blending a petroleum feedstock corresponding to the petroleum stream with a blending feedstock to achieve a blended petroleum with desired relative concentrations of the two or more components in the one or more fractions of the petroleum stream.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combi

FIG. 3 is a GC-FID chromatogram of FID response as a function of elution time (1st dimensional retention time) for diesel.

DETAILED DESCRIPTION

Figure 1:
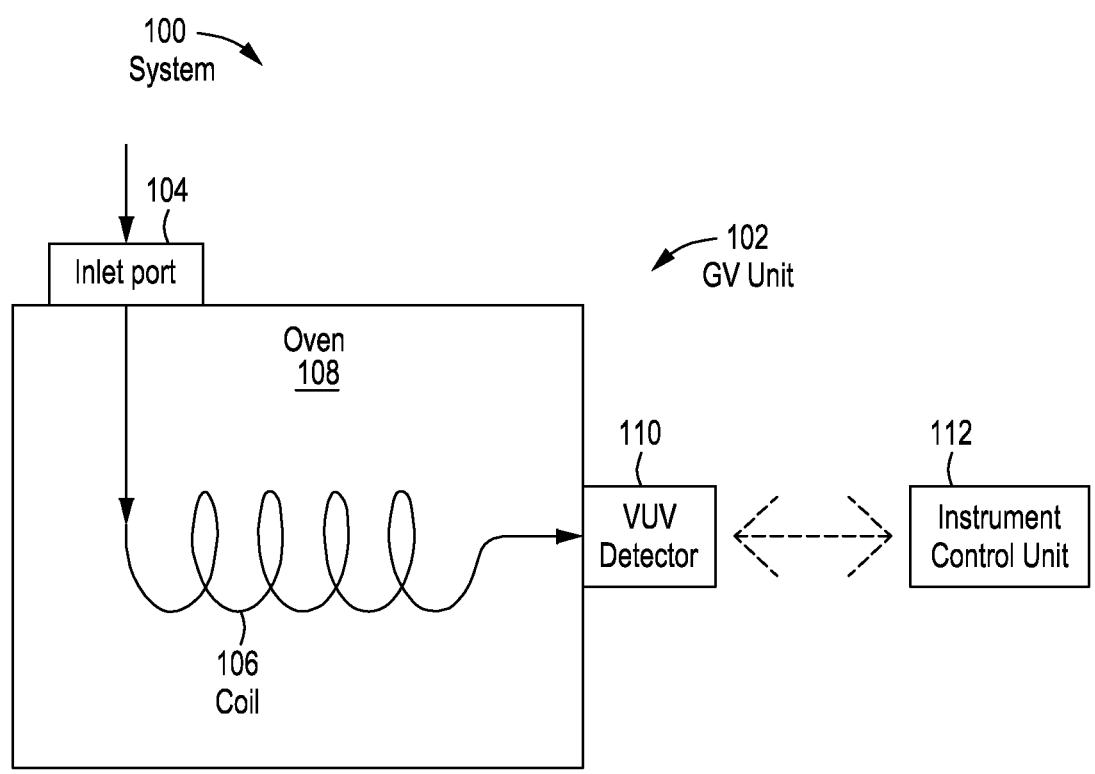
- FIG. 1 is a diagram illustration of a GC-VUV system suitable for use in the methods of the present invention.

The present invention relates to the characterization of petroleum streams with GC-VUV Simulated Distillation.

Recent development in GC detector technology has advanced the development of spectroscopic detection such as VUV spectroscopy, which can provide a board wavelength spectrum of eluting components. Without being limited by theory, the advantages of VUV detection is the excellent response and specificity to molecular structures that contain one or more double bond and straight carbon chains (e.g., a saturation and unsaturation functional group). Depending on the molecular structure, saturated structures and unsaturated structures may have a different absorption band in the VUV spectrum. With GC separation enhanced with VUV detection, the qualitative and quantitative distribution of different type saturation and unsaturation group in the molecules can be visualized in a Simulated Distillation. The additional information of saturation and unsaturation functional group distributions as a function of boiling temperature can provide advantages needed to correlate composition to distillation cut, stream blend, reactivity, oxidation stability, solubility, and compatibility, and the like. Knowledge of such properties will improve refinery efficiency and profitability.

Another advantage of GC-VUV Simulated Distillation is no additional time or resources are required other than the initial capital add for the VUV detector to conventional GC (e.g., GC-FID) equipment and methods. The information provided by GC-VUV Simulated Distillation can be obtained using more costly, complex, and resource intensive instrumentation such as GC field ionization mass spectroscopy (GC-FIMS) and/or GC electron impact mass spectroscopy (GC-EIMS).

Definitions and Test Methods

As used herein, the term "GC" refers to a gas chromatograph or gas chromatography with no limitation as to the detectors or detection methods coupled to the GC. As used herein, the term "GC" coupled with an acronym or statement of a detector or detection method does not limit the GC to only that detector or detection method. For example, as used herein, the term "GC-VUV" refers to a gas chromatograph with at least a vacuum ultraviolet detector or gas chromatography with vacuum ultraviolet detection. That is, other detectors or detection methods can be coupled with gas chromatograph or gas chromatography.

As used herein, the term "petroleum stream" refers to a liquid mixture of hydrocarbons and is not limited by the source of the mixture. For example, the petroleum stream can be as-extracted crude oil, oil derived from oil sands, condensates, pyrolysis products, or blended mixture of hydrocarbons.

As used herein, the term "component" when referring to a petroleum stream or feedstock is a chemical or group of chemicals of the petroleum stream. As used herein, the term "fraction" when referring to a petroleum stream or feedstock refers to a portion of the stream or feedstock that corresponds to a specific elution time or boiling point or a specific elution time range or boiling point range.

As used herein, when describing components of a system that are fluidly coupled, the fluid coupling refers to fluids being able to travel from one component to the other or between components. When traversing a fluid coupling, the fluid may travel through hardware like pumps, connectors, heat exchangers, and valves that ensure proper operation and safety measures when operating the system.

The terms "non-transitory, computer-readable medium," "tangible machine-readable medium," or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

Systems and Methods

FIG. 1 is a diagram illustration of a GC-VUV system 100 suitable for use in the methods of the present invention. The system 100 includes at GU unit 102 that comprises an inlet port 104 fluidly connected to a coil 106 (or column) that resides in an oven 108. The coil 106 is fluidly connected to a VUV detector 110.

Examples of columns suitable for use in the present invention include, but are not limited to, BPXS (a 5%-phenyl polysilphenylene-siloxane filled column, available from SGE Analytical Science), DB-5 (a 5%-phenyl methylpolysiloxane filled column, available from Aligent Technologies), DB-5 ms (a phenyl arylene polymer filled column, available from Aligent Technologies), XTI-5 (a CROSS-BOND™ 5% phenyl polymer filled column, available from Fischer Scientific), HP-5 (a 5%-phenyl methylpolysiloxane filled column, available from Aligent Technologies), and the like.

Methods of using the system 100 can include injecting a petroleum stream into the inlet port 104 and separating the petroleum stream based on boiling point with the coil 106. The resultant separated stream is sent to the VUV detector 110 for analysis. In some instances, the VUV detector 110 may be separate from the oven 108 and a transfer line (not shown) may extend from the coil 106 outside the oven 108 and to the VUV detector 110 to fluidly connect the coil 106 and the VUV detector. In such instances, the portion of the transfer line outside the oven 108 should be heated to maintain mobility of the components in the petroleum stream. The transfer line can be at any suitable temperature, preferably within about 25° C. of the oven 108 maximum temperature. For example, the transfer line can be at a temperature of 300° C. to 400° C., or alternatively 325° C. to 375° C.

The system 100 or individual components thereof are coupled to an instrument control unit 112. The instrument control unit 112 can include a non-transitory computer readable medium containing instructions that, when implemented, cause one or more processors to control the individual components. For example, the processors may control the temperature, temperature ramp rate, and temperature decrease rate of the oven 108. Additionally, the processors may perform the wavelength-specific analyses described herein on the VUV detector measurements.

Additionally, the processors may control the temperature of the injection port 104.

Figure 2:
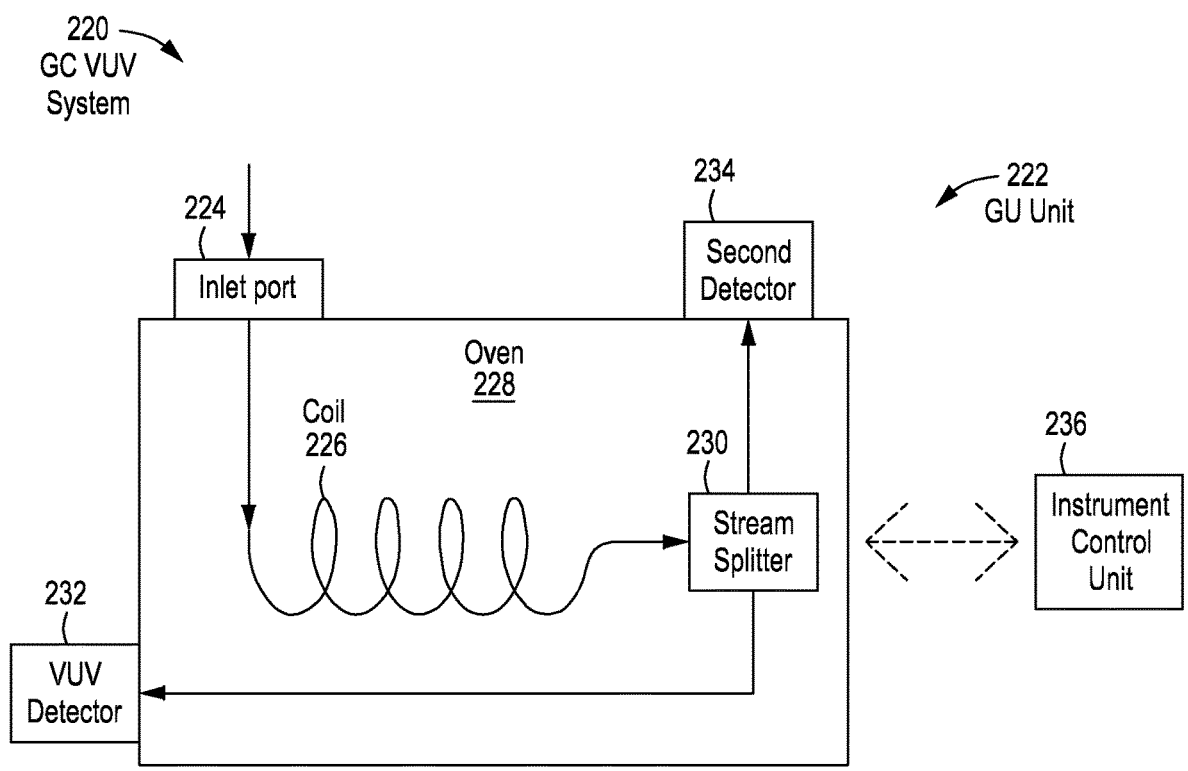
FIG. 2 is a diagram illustration of a GC-VUV system suitable for use in the methods of the present invention.

FIG. 2 is a diagram illustration of a GC-VUV system 220 suitable for use in the methods of the present invention. The system 220 includes at GU unit 222 that comprises an inlet port 224 fluidly connected to a coil 226 (or column, for example, as described in FIG. 1) that resides in an oven 228. The coil 226 is fluidly connected to a stream splitter 230 that splits the fluid coming into the stream splitter 230 between two or more detectors, which is illustrated as two detectors: a VUV detector 232 and a second detector 234. Alternative to the illustration, three or more detectors can be included in the system. Other detectors can include, but are not limited to, FIDs, mass spectrometers, atomic emission detectors, chemiluminescence detectors, photoionization detectors, field ionization mass spectrometers, electron impact mass spectrometers, and the like, and any combination thereof.

Methods of using the system 220 can include injecting a petroleum stream into the inlet port 224 and separating the petroleum stream based on boiling point with the coil 226. The resultant separated stream is sent to the stream splitter 230 that splits the separated stream between the two or more detectors 232, 234. The degree of separation of the separated stream depends on the amount of sample each detector requires to provide good signal to noise measurements. As describe in FIG. 1 relative to the VUV detector 110, the VUV detector 232 of FIG. 2 can also be separate from the oven 228 where a transfer line (not shown) extends beyond the oven 228 and fluidly couples the stream splitter 230 and the VUV detector 232.

The system 220 or individual components thereof are coupled to an instrument control unit 236. The instrument control unit 236 can include a non-transitory computer readable medium containing instructions that, when implemented, cause one or more processors to control the individual components. For example, the processors may control the temperature, temperature ramp rate, and temperature decrease rate of the oven 228. Additionally, the processors may perform the wavelength-specific analyses described herein on the VUV detector measurements. Additionally, the processors may control the temperature of the injection port 224.

The VUV detector 110, measures absorbance versus retention time. Different wavelength ranges correspond to different electronic transition states that reflect the type of bonding. Table 1 provides wavelength ranges and electronic transition states corresponding to bond types component.

TABLE 1

| Wavelength Range | Electronic Transition State | Bond Type Component |
| --- | --- | --- |
| 125 nm to 160 nm | $\sigma \rightarrow \sigma^*$ | saturated hydrocarbons |
| 180 nm to 200 nm | $\pi \rightarrow \pi^*$ | one-ring aromatics |
|  | $n \rightarrow \sigma^*$ |  |
|  | $n \rightarrow \pi^*$ |  |
| 200 nm to 230 nm | $\pi \rightarrow \pi^*$ | two-ring aromatics |
|  | $n \rightarrow \sigma^*$ |  |
|  | $n \rightarrow \pi^*$ |  |
| 230 nm to 260 nm | $\pi \rightarrow \pi^*$ | three-ring aromatics |
|  | $n \rightarrow \sigma^*$ |  |
|  | $n \rightarrow \pi^*$ |  |

Methods of the present invention may include measuring the absorbance as a function of elution time (a chromatograph) for a wavelength range corresponding to one or more components of the petroleum stream selected from the group consisting of: a saturates component, a one-ring aromatics component, a two-ring aromatics component, and a three-ring aromatics component of the petroleum stream.

The absorbance versus elution time chromatographs can be converted to absorbance versus temperature (boiling point) chromatographs. The integral of the absorbance versus temperature chromatographs results in a mole percent of total petroleum stream versus temperature plot. The mole percent of petroleum stream versus temperature plots can be used to determine a variety of characteristics and properties of the petroleum stream, discussed further herein.

When the VUV detector is used in combination with another detector, the characteristics and properties of the petroleum stream determined from the other detector can be calculated and/or correlated to the mole percent of petroleum stream versus temperature plots (and/or other chromatographs) from the VUV analysis.

By way of nonlimiting example, a FID detector can yield a weight percent of petroleum stream as a function temperature (boiling point) plot. The conversion between mole percentage (mole %) and weight percentage (wt %) requires an assumption of average molecular weight of total petroleum stream and/or whole sample used in the experiment. Then, by combining the VUV analyses and the FID analyses a weight percent of petroleum stream as a function of bond type can be produced. Then, the relative amounts of the components in the petroleum stream can be calculated for a specific boiling temperature or a range of boiling temperatures.

Alternatively, the relative amounts of the components in the petroleum stream can be calculated for a specific boiling temperature or a range of boiling temperatures from the VUV data and a table provided as an output. Table 2 is an example output where the relative concentrations of each component are calculated for more than one temperature range.

TABLE 2

| Bond Type Component | Mole Percent at 225° C. to 260° C. | Mole Percent at 275° C. to 375° C. |
|---|---|---|
| saturated hydrocarbons | 80 | 40 |
| one-ring aromatics | 10 | 30 |
| two-ring aromatics | 5 | 15 |
| three-ring aromatics | 5 | 15 |

These and other combinations of two or more detector analyses can be used to characterize the components in the fractions of the petroleum stream in a GC-VUV Simulated Distillation.

In a first example, after GC-VUV Simulated Distillation, methods can further include determining a reactivity of one or more fractions of the petroleum stream based on the relative concentrations of the components in the one or more fractions of the petroleum stream.

In another example, after GC-VUV Simulated Distillation, methods can further include determining an oxidation stability of the petroleum stream based on the relative concentrations of the components in one or more fractions of the petroleum stream.

In another example, after GC-VUV Simulated Distillation, methods can further include determining a solubility of one or more fractions of the petroleum stream in a solvent comprising one or more organic solvents (e.g., ethanol and other organic fuel additives) based on the relative concentrations of the components in one or more fractions of the petroleum stream. In another example, after GC-VUV Simulated Distillation, methods can further include determining a solubility of one or more fractions of the petroleum stream in a solvent comprising one or more inorganic solvents (e.g., inorganic fuel additives) based on the relative concentrations of the components in one or more fractions of the petroleum stream. In another example, after GC-VUV Simulated Distillation, methods can further include determining a solubility of one or more fractions of the petroleum stream in a solvent comprising one or more organic solvents and one or more inorganic solvents based on the relative concentrations of the components in one or more fractions of the petroleum stream.

In another example, after GC-VUV Simulated Distillation, methods can further include determining a compatibility of petroleum stream and/or one or more fractions thereof with other crude oils based on the relative concentrations of the components in the petroleum stream and/or one or more fractions thereof. In another example, after GC-VUV Simulated Distillation, methods can further include determining a compatibility of petroleum stream and/or one or more fractions thereof with other refinery streams based on the relative concentrations of the components in the petroleum stream and/or one or more fractions thereof. In another example, after GC-VUV Simulated Distillation, methods can further include determining a compatibility of petroleum stream and/or one or more fractions thereof with other crude oils and other refinery streams based on the relative concentrations of the components in the petroleum stream and/or one or more fractions thereof. The other crude oils and other refinery streams may be added to one or more fractions of the petroleum stream to produce a blend that has a desired set of properties like viscosity, octane level, and the like.

The other crude oils and other refinery streams may added to the petroleum feedstock from which the petroleum stream is derived to produce a blend that, when distilled, has fractions with a desired set of properties like viscosity, octane level, and the like. The compositional makeup of the petroleum feedstock and/or one or more fractions thereof from which the petroleum stream is derived can be determined as described above. Then, the petroleum feedstock can be blended with a blending feedstock to produce a blended petroleum with desired relative concentrations of the petroleum stream components. For example, if the GC-VUV Simulated Distillation includes a fraction with moderately high two- and three-ring component concentrations, and a higher concentration of two- and three-ring aromatics would add value to the fraction, the petroleum feedstock may be blended with a blending feedstock that has a high concentration of two- and three-ring aromatics at the corresponding boiling points to produce an upgraded fraction.

Instrument Control Units

The methods described herein can be performed using instrument control units (e.g., computing devices or processor-based devices) that include a processor; a memory coupled to the processor; and instructions provided to the memory, wherein the instructions are executable by the processor to perform the methods described herein. The instructions can be a portion of code on a non-transitory computer readable medium. Any suitable processor-based device may be utilized for implementing all or a portion of embodiments of the present techniques, including without limitation personal computers, networks personal computers, laptop computers, computer workstations, mobile devices, multi-processor servers or workstations with (or without) shared memory, high performance computers, and the like. Moreover, embodiments may be implemented on application specific integrated circuits (ASICs) or very large scale integrated (VLSI) circuits.

Communication between an instrument control unit and one or more components of the system can be wired or wireless.

Example Embodiments

A nonlimiting example embodiment of the present invention is a method to simulate distillation of a petroleum stream by gas chromatography, the method comprising: separating the petroleum stream with a gas chromatograph as a function of boiling point; passing the separated petroleum stream through a vacuum ultraviolet detector to yield data comprising a vacuum ultraviolet signal as a function of boiling point; integrating the vacuum ultraviolet signal as a function of boiling point over two or more wavelength ranges to derive relative concentrations of two or more components of the separated petroleum stream that correspond to the two or more wavelength ranges.

Another nonlimiting example embodiment of the present invention is a method to simulate distillation of a petroleum stream by gas chromatography comprising: separating the petroleum stream with a gas chromatograph as a function of boiling point; passing a first portion of the separated petroleum stream through a vacuum ultraviolet detector to yield data comprising a vacuum ultraviolet signal as a function of boiling point; passing a second portion of the separated petroleum stream through a flame ionization detector (FID) to yield data comprising a FID response as a function of boiling point; integrating the vacuum ultraviolet signal as a function of boiling point over two or more wavelength ranges to derive relative concentrations of two or more components of the separated petroleum stream that correspond to the two or more wavelength ranges; integrating the FID response as a function of boiling point over to derive weight percent of the separated petroleum stream as a function of boiling point; and correlating the relative concentrations of two or more components of the separated petroleum stream with the weight percent of the separated petroleum stream as a function of boiling point.

The foregoing methods can optionally include one or more of the following: Element 1: wherein the two or more components and corresponding wavelength ranges are selected from the group consisting of: a saturates component at 125 nm to 160 nm, a one-ring aromatics component at 180 nm to 200 nm, a two-ring aromatics component at 200 nm to 230 nm, and a three-ring aromatics component at 230 nm to 260 nm corresponding a boiling point range of the separated petroleum stream; Element 2: wherein integrating the vacuum ultraviolet signal as a function of boiling point is for a specific boiling point; Element 3: wherein integrating the vacuum ultraviolet signal as a function of boiling point is for a boiling point range; Element 4: the method further comprising: determining a reactivity of the petroleum stream based on the relative concentrations of the two or more components in the one or more fractions of the petroleum stream; Element 5: the method further comprising: determining an oxidation stability of the petroleum stream based on the relative concentrations of the two or more components in the one or more fractions of the petroleum stream; Element 6: the method further comprising: determining a solubility of the petroleum stream in a solvent comprising one or more organic solvents based on the relative concentrations of the two or more components in the one or more fractions of the petroleum stream; Element 7: the method further comprising: determining a solubility of the petroleum stream in a solvent comprising one or more inorganic solvents based on the relative concentrations of the two or more components in the one or more fractions of the petroleum stream; Element 8: the method further comprising: determining a solubility of the petroleum stream in a solvent comprising one or more organic solvents and one or more inorganic solvents based on the relative concentrations of the two or more components in the one or more fractions of the petroleum stream; Element 9: the method further comprising: determining a compatibility of the petroleum stream with other crude oils based on the relative concentrations of the two or more components in the one or more fractions of the petroleum stream; Element 10: the method further comprising: determining a compatibility of the petroleum stream with other refinery streams based on the relative concentrations of the two or more components in the one or more fractions of the petroleum stream; Element 11: the method further comprising: determining a compatibility of the petroleum stream with other crude oils and other refinery streams based on the relative concentrations of the two or more components in the one or more fractions of the petroleum stream; Element 12: the method further comprising: distilling a petroleum feedstock corresponding to the petroleum stream with distillation cut point temperatures based on the relative concentrations of the two or more components in the one or more fractions of the petroleum stream; Element 13: the method further comprising: blending a petroleum feedstock corresponding to the petroleum stream with a blending feedstock to achieve a blended petroleum with desired relative concentrations of the two or more components in the one or more fractions of the petroleum stream; Element 14: the method further comprising: passing a portion of the separated petroleum stream through one or more additional detectors selected from the group consisting of: a flame ionization detector, a mass spectrometer, an atomic emission detector, a chemiluminescence detector, a photoionization detector, a field ionization mass spectrometer, and an electron impact mass spectrometer; Element 15: Element 14 and the method further comprising: correlating a characteristic or property of the separated petroleum stream derived from the one or more additional detectors with the relative concentrations of two or more components of the separated petroleum stream; Element 16: wherein a column of the gas chromatograph comprises one or more polymer selected from the group consisting of: a 5%-phenyl polysilphenylene-siloxane, a phenyl arylene polymer, a 5% phenyl polymer, and a 5%-phenyl methylpolysiloxane; Element 17: wherein the petroleum stream separated as a function of boiling point passes through a transfer line that extends from the gas chromatograph to the vacuum ultraviolet detector; and Element 18: wherein the transfer line is maintained at 300° C. to 400° C.

Examples of combinations include, but are not limited to, Element 1 in combination with Element 14 and optionally in further combination with Element 15; Element 2 and/or 3 in combination with Element 14 and optionally in further combination with Element 15; one or more of Elements 4-11 in combination with Element 14 and optionally in further combination with Element 15; Element 12 and/or in combination with Element 14 and optionally in further combination with Element 15; Elements 12 and 13 in combination optionally in further combination with one or more of Elements 1-11; two or more of Elements 4-11 in combination; Element 1 in combination with Element 2 and/or 3; Element 1 in combination with one or more of Elements 4-11; Element 1 in combination with Element 12 and/or 13; one or more of Elements 16-18 in combination with one or more of Elements 1-15; two or more of Elements 16-18 in combination; and so on.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

A diesel fuel mixture was used the petroleum stream in a GC-VUV Simulation Distillation of the present invention. The diesel fuel mixture is a typical refinery stream, boiling between 150° C. (300° F.) and 430° C. (800° F.) with carbon numbers from approximately C8 to C28.

The instrumentation set-up was similar to FIG. 2 but with a transfer line that extended out of the oven and to a separate VUV detector. More specifically, the GC system was an Agilent 6890 gas chromatograph (available from Agilent Technology) configured with inlet, columns, and detectors. A split/splitless inlet system with an eight-vial tray autosampler was used. The capillary column system utilizes of weakly polar column (BPX-5 column having a 30 m length, 0.25 mm inner diameter, and 1.0 μm film).

A 0.2 μL sample was injected via a split/splitless (S/S) injector with 50:1 split at 300° C. in constant flow mode of 2.0 mL per minute helium. The oven was programmed from to ramp from 45° C. to 315° C. at a rate of 3° C. for a total run time of 90 min. The effluent was split and directed to a FID and a VUV. The sampling rate for the FID was 5 Hz. An Agilent ChemStation was used as the instrument control unit to provide GC control and data acquisition of FID. After data were acquired, the FID signal was processed for qualitative and quantitative analysis using internally developed software.

The VUV detector was a VGA-101 available from VUV Analytics, Inc. In the VUV detector, the operational parameters used were based on the manufacture setting and recommendations without further adjustment. The VUV spectrum range was set from 125 nm to 430 nm. The spectrum resolution was set at 0.2 nm. The transfer line was set at 350° C. The data acquisition rate in the VUV was approximately 5 Hz. After data were acquired, the VUV signal was processed for qualitative and quantitative analysis using internally developed software.

Figure 3:
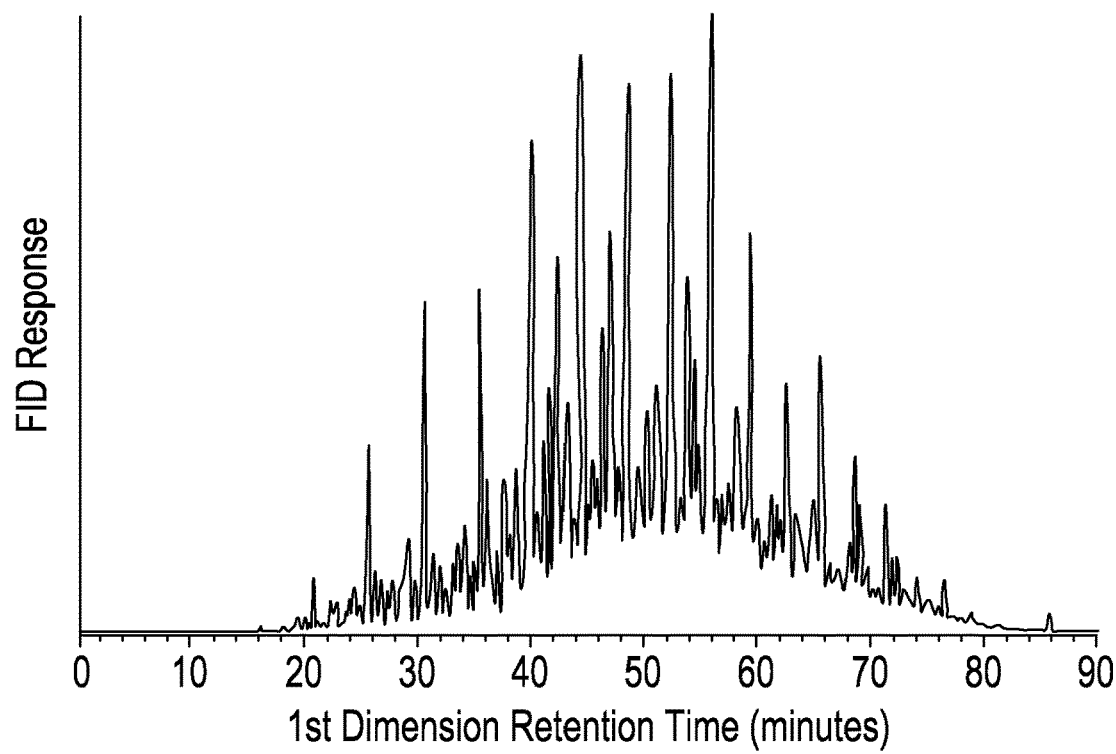
FIG. 3 illustrates a nonlimiting example of a two-detector analysis result.

FIG. 3 is a GC-FID chromatogram of FID response as a function of elution time (1st dimensional retention time) for diesel. Because the diesel is a complex hydrocarbon mixture, individual components are not completely resolved. The GC-FID chromatogram shows major peaks of normal paraffin with minor peaks of isoparaffins. Many other molecules with varying degrees of unsaturated functional groups (different aromatic ring structures) co-eluted along with normal and isoparaffins during the GC column separation. These co-eluted molecules are evident in the chromatogram as a largely unresolved hump close to the base line spread out from retention time 20 minutes to 80 minutes.

Figure 4:
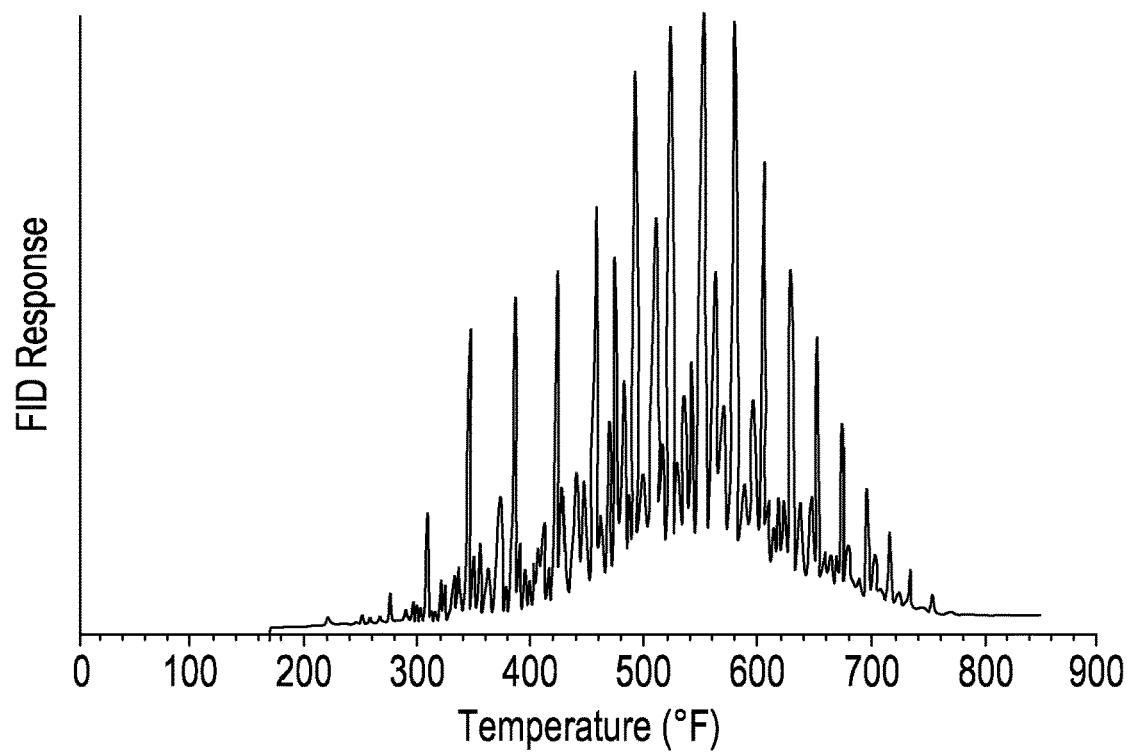
FIG. 4 is a GC-FID chromatogram of FID response as a function of temperature for diesel.

Since the elution time of hydrocarbons is closely tied to its boiling temperature, the GC-FID chromatogram can be converted to a temperature-yield profile replicating physical distillation yield curves. To convert elution time to boiling temperature, a mixture of hydrocarbons with known boiling point (e.g., normal alkanes are used to calibrate retention time to temperature). FIG. 4 is a GC-FID chromatogram of FID response as a function of temperature (boiling point) for diesel.

Figure 5:
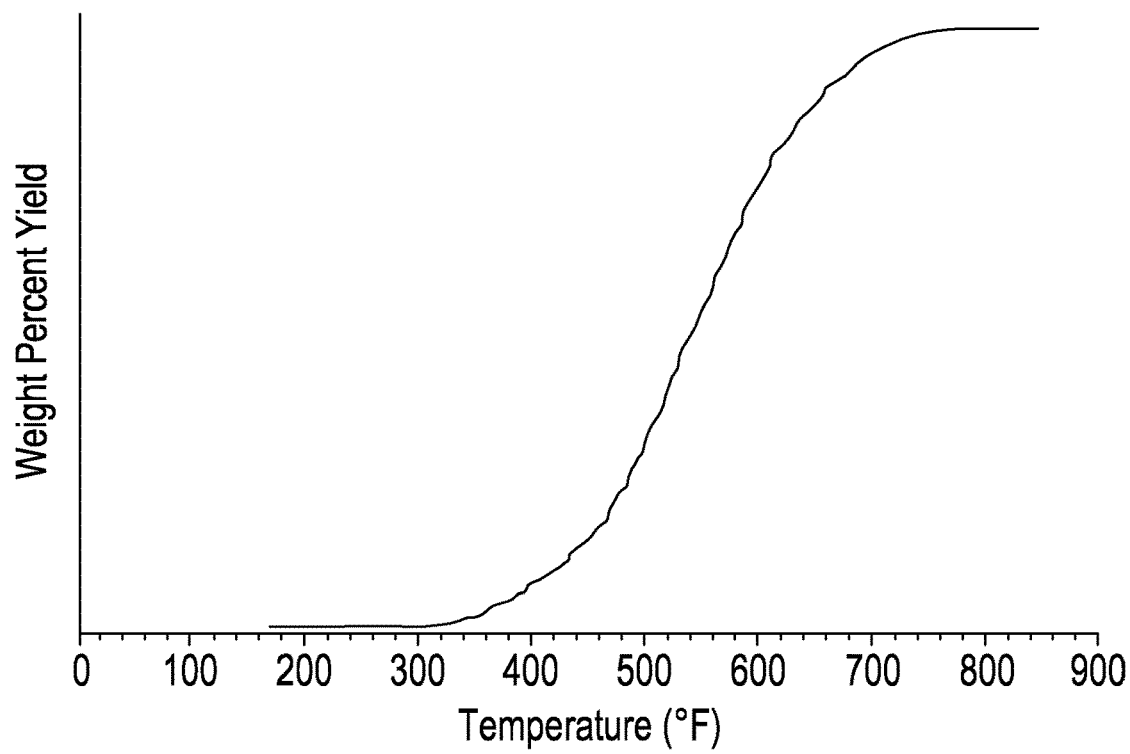
FIG. 5 is a GC-FID plot of weight percent as a function of temperature for diesel.

A Simulation Distillation plot can be constructed be summing the FID signal as a function of calibrated boiling temperature. FIG. 5 is a GC-FID plot of weight percent as a function of temperature for diesel. Since the FID response for most hydrocarbons is closely proportional to weight, no response factor correction is necessary and the accumulated signal intensity can be used as weight percentage.

Figure 6:
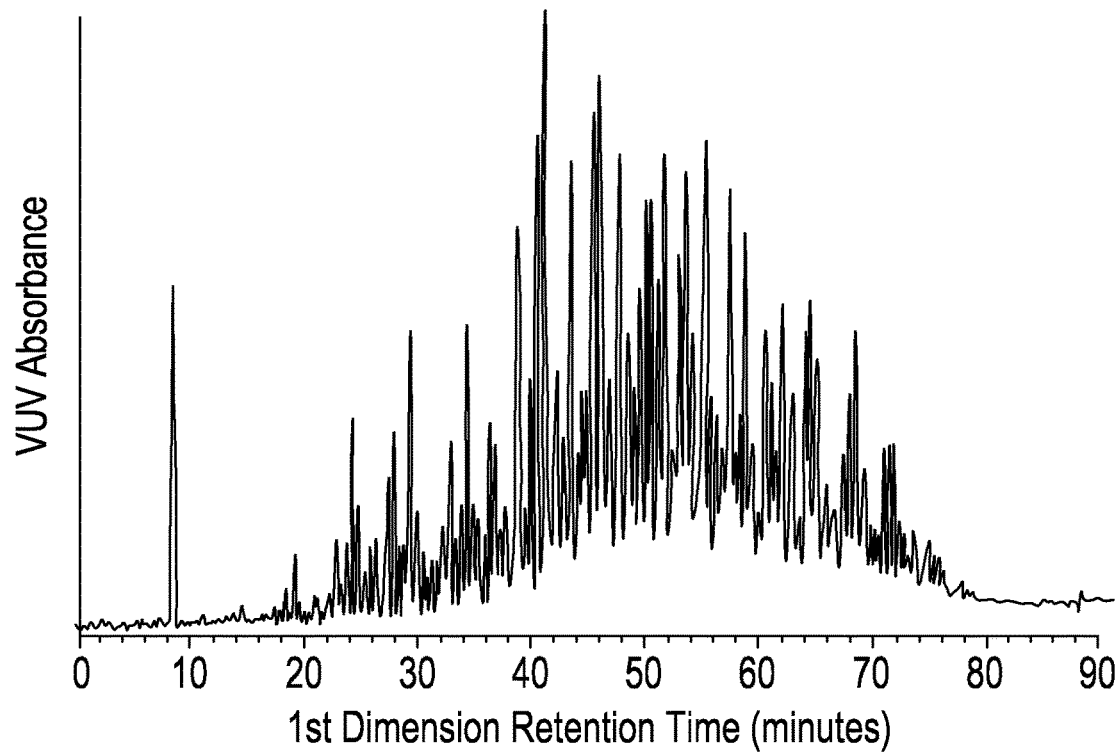
FIG. 6 is a GC-VUV chromatogram of VUV absorbance as a function of elution time for diesel over the full 125 nm to 430 nm wavelength range measured.

FIG. 6 is a GC-VUV chromatogram of VUV absorbance as a function of elution time for diesel over the full 125 nm to 430 nm wavelength range measured. In GC-VUV, a complete VUV spectrum is collected for each elution time. If a component elutes or a group of components co-eluted, the VUV spectrum will reflect the different absorbance bands characteristic of that component or group of components. By knowing saturation and unsaturation functional group correlated to each specific absorbance band (see Table 1), the corresponding signal for the wavelength range can be plotted as a function of the retention time to provide the distribution of that specific saturation and unsaturation functional group in the original mixture. If the absorbance band has been calibrated with known concentration standards, the mole percent concentration of that functional group can be calculated. The same as FID chromatogram, a set of know boiling point standards can be used to correlate retention time to boiling temperature.

Figure 7:
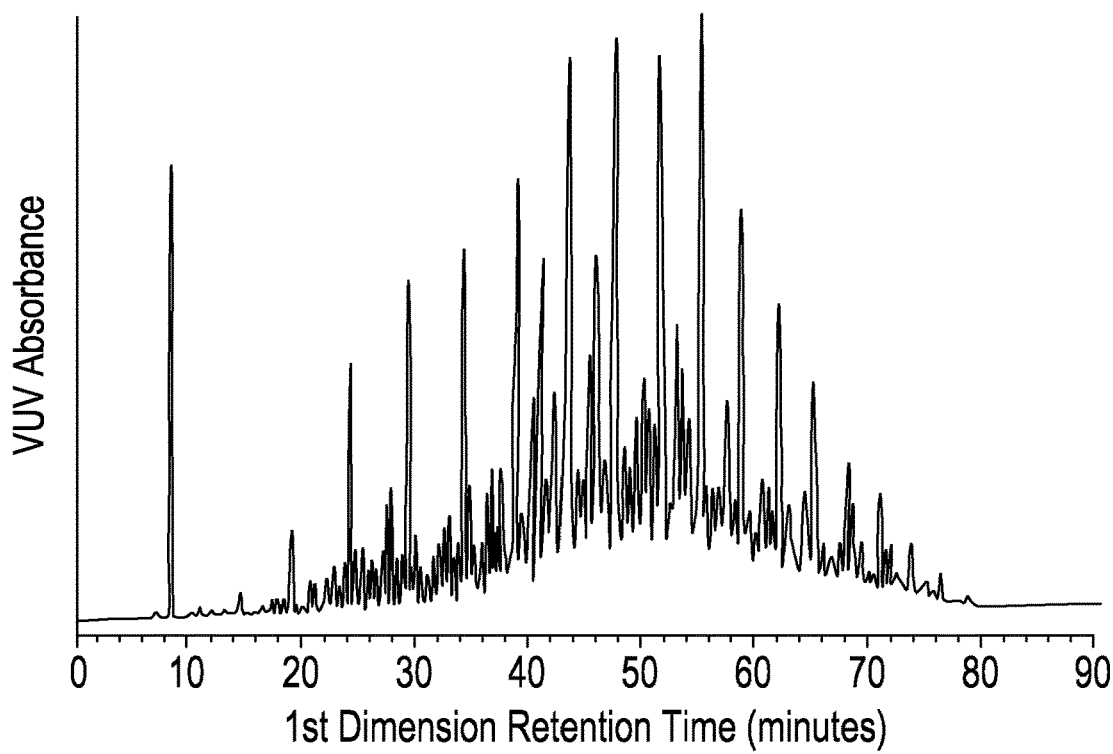
FIG. 7 is a GC-VUV chromatogram of VUV absorbance as a function of elution time for diesel over the full 125 nm to 160 nm wavelength range measured.
Figure 8:
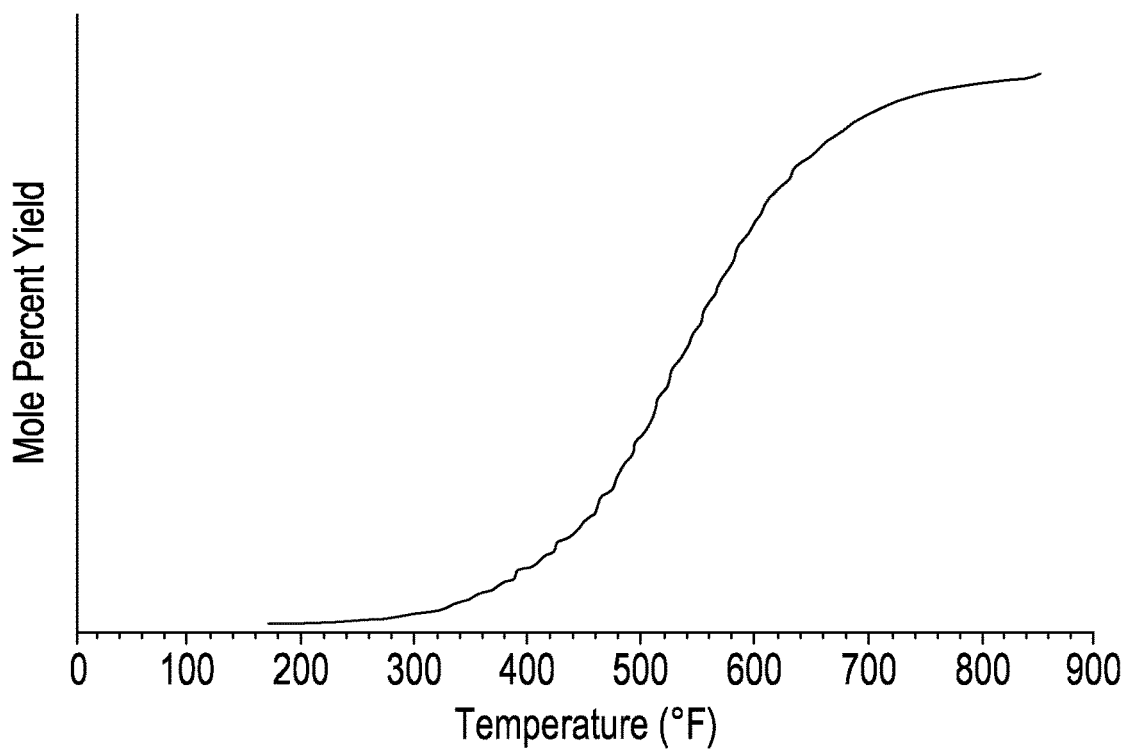
FIG. 8 is a GC-VUV plot of mole percent as a function of temperature for diesel over the 125 nm to 160 nm wavelength range.

FIG. 7 is a GC-VUV chromatogram of VUV absorbance as a function of elution time for diesel over the full 125 nm to 160 nm wavelength range measured. The absorbance between 125 nm to 160 nm corresponds to the σ→σ* electronic state transition with saturated hydrocarbons. These transitions include straight and branched aliphatic chains as well as saturated cyclic structures. FIG. 8, which is derived from FIG. 7 using correlations determined with known concentrations of components with known boiling points, is a GC-VUV plot of mole percent as a function of temperature for diesel over the 125 nm to 160 nm wavelength range.

Figure 9:
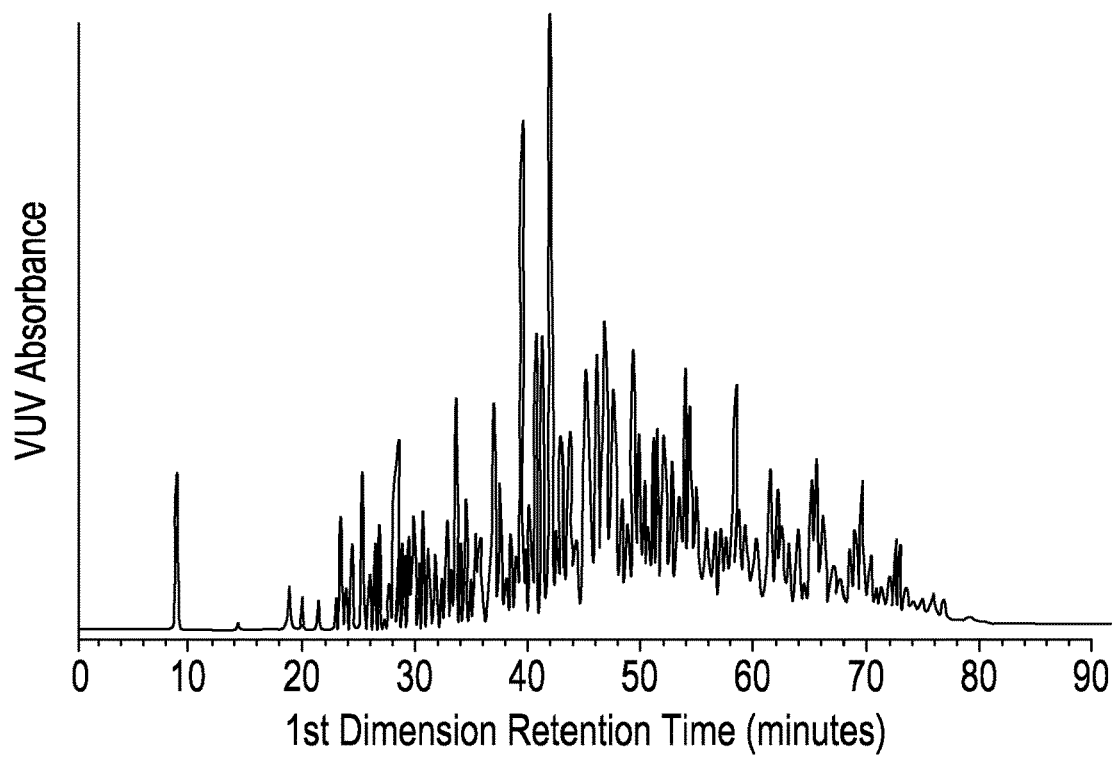
FIG. 9 is a GC-VUV chromatogram of VUV absorbance as a function of elution time for diesel over the full 180 nm to 200 nm wavelength range measured.
Figure 10:
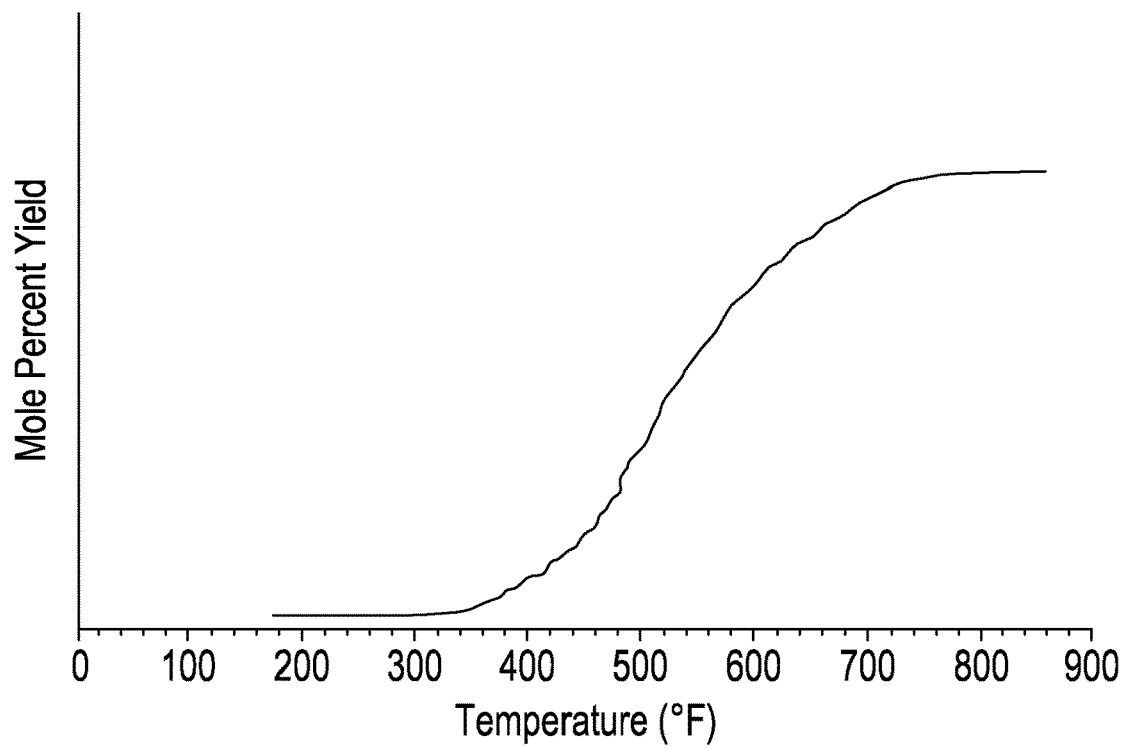
FIG. 10 is a GC-VUV plot of mole percent as a function of temperature for diesel over the 180 nm to 200 nm wavelength range.

FIG. 9 is a GC-VUV chromatogram of VUV absorbance as a function of elution time for diesel over the full 180 nm to 200 nm wavelength range measured. The absorbance between 180 nm to 200 nm corresponds to the π→π*, n→σ*, and n→π* electronic state transition with unsaturated hydrocarbons. These transitions include alkyl benzene and/or benzene-like one aromatic ring structure. FIG. 10, which is derived from FIG. 9 using correlations determined with known concentrations of components with known boiling points, is a GC-VUV plot of mole percent as a function of temperature for diesel over the 180 nm to 200 nm wavelength range.

Figure 11:
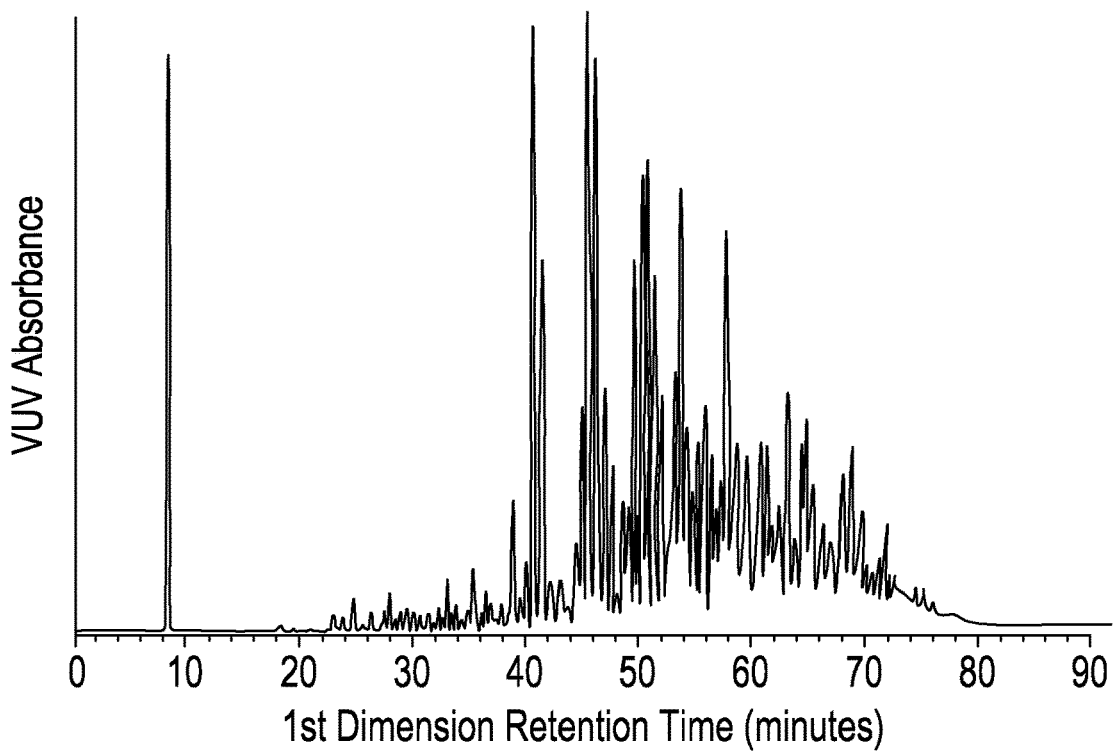
FIG. 11 is a GC-VUV chromatogram of VUV absorbance as a function of elution time for diesel over the full 200 nm to 230 nm wavelength range measured.
Figure 12:
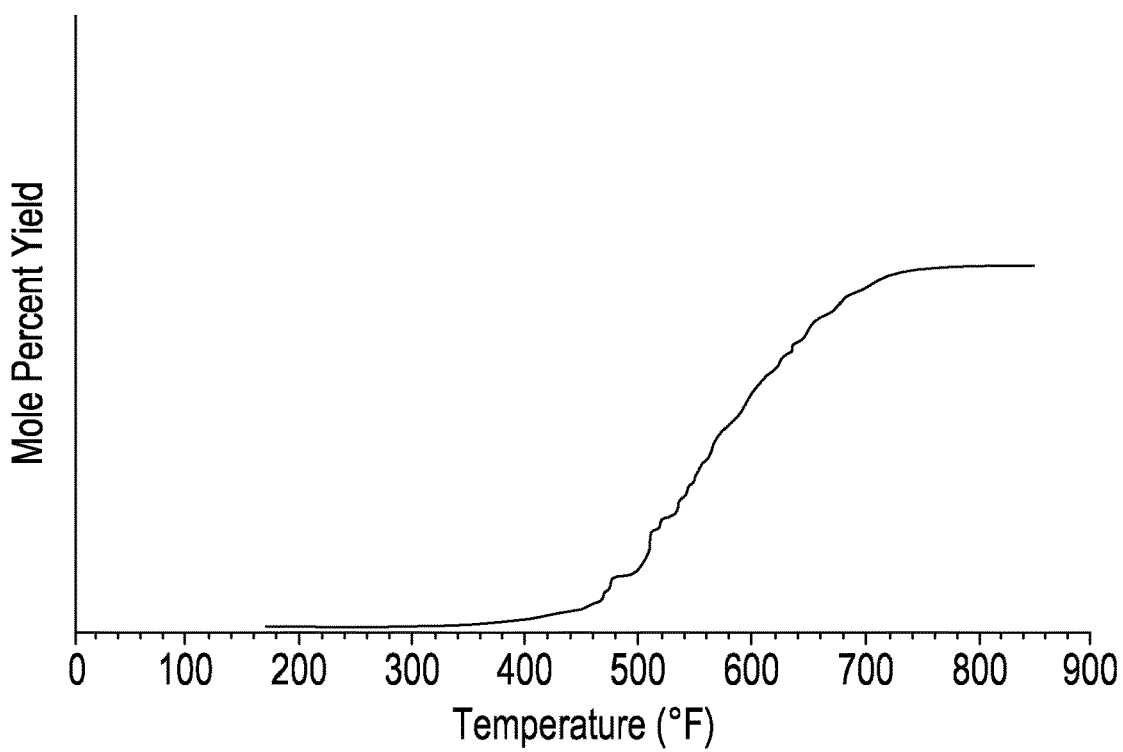
FIG. 12 is a GC-VUV plot of mole percent as a function of temperature for diesel over the 200 nm to 230 nm wavelength range.

FIG. 11 is a GC-VUV chromatogram of VUV absorbance as a function of elution time for diesel over the full 200 nm to 230 nm wavelength range measured. The absorbance between 200 nm to 230 nm corresponds to the π→π*, n→σ*, and n→π* electronic state transition with unsaturated hydrocarbons. These transitions include alkyl naphthalene and/or naphthalene-like two aromatic ring structures. FIG. 12, which is derived from FIG. 11 using correlations determined with known concentrations of components with known boiling points, is a GC-VUV plot of mole percent as a function of temperature for diesel over the 200 nm to 230 nm wavelength range.

Figure 13:
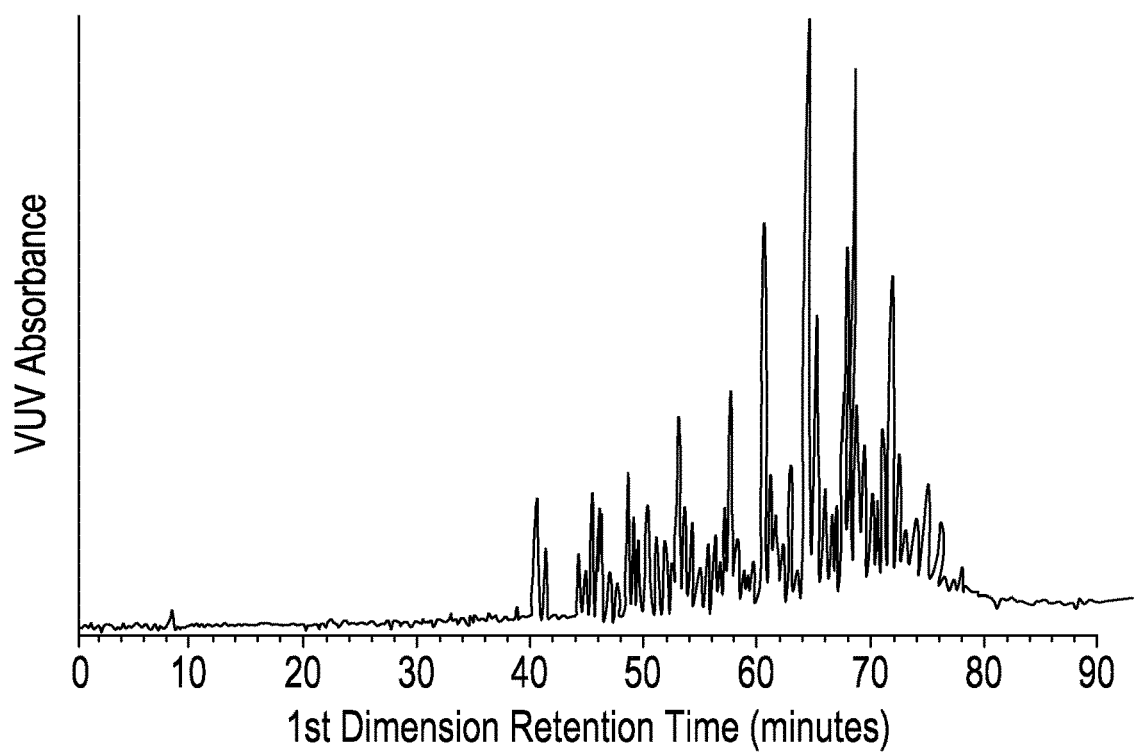
FIG. 13 is a GC-VUV chromatogram of VUV absorbance as a function of elution time for diesel over the full 230 nm to 260 nm wavelength range measured.
Figure 14:
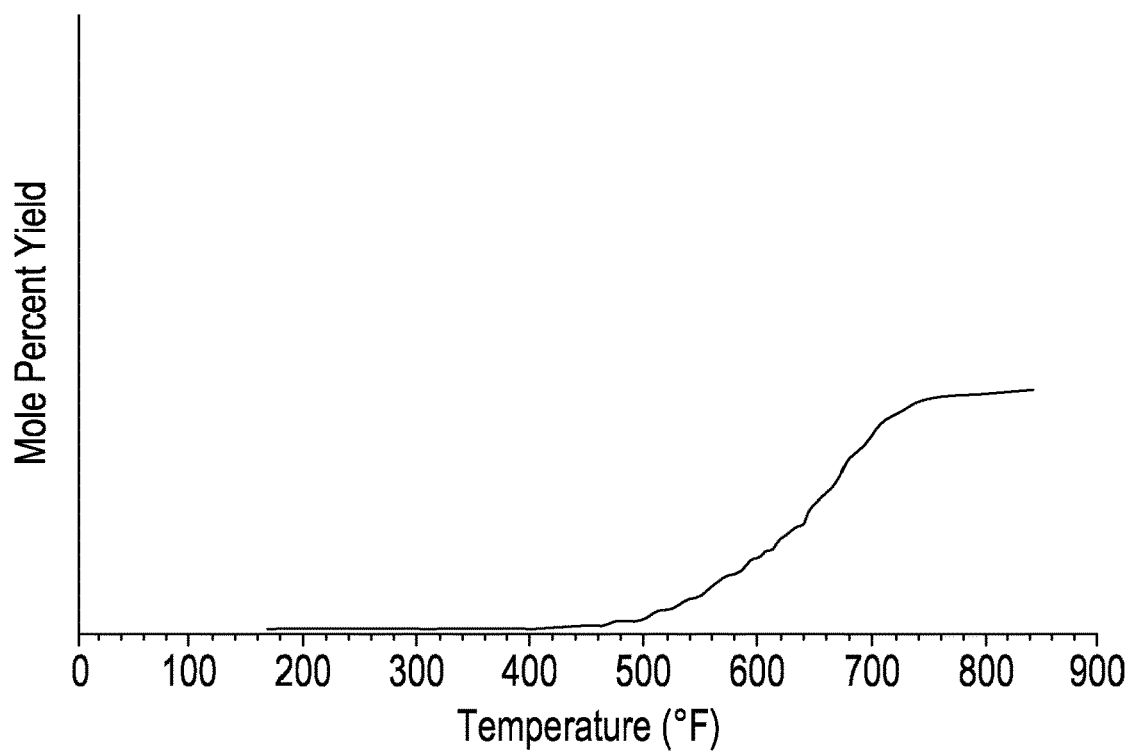
FIG. 14 is a GC-VUV plot of mole percent as a function of temperature for diesel over the 230 nm to 260 nm wavelength range.

FIG. 13 is a GC-VUV chromatogram of VUV absorbance as a function of elution time for diesel over the full 230 nm to 260 nm wavelength range measured. The absorbance between 230 nm to 260 nm corresponds to the π→π*, n→σ*, and n→π* electronic state transition with unsaturated hydrocarbons. These transitions include alkyl phenanthrene and/or phenanthrene-like three aromatic ring structures. FIG. 14, which is derived from FIG. 13 using correlations determined with known concentrations of components with known boiling points, is a GC-VUV plot of mole percent as a function of temperature for diesel over the 230 nm to 260 nm wavelength range.

One important note needs to be made here, the u-axis of all GC-VUV plot of mole percent as a function of temperature with different wavelength ranges needs to be calibrated with each absorbance standard in order to convert the absorbance signal intensity to corresponded concentration. The cross-section (response factor) of VUV absorbance will be different from each different unsaturated structure. It will require extra precaution when cross-reference different saturation and unsaturation structures.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    separating the petroleum stream with a gas chromatograph as a function of boiling point;
    passing the separated petroleum stream through a vacuum ultraviolet detector to yield data comprising a vacuum ultraviolet signal as a function of boiling point; and
    integrating the vacuum ultraviolet signal as a function of boiling point over two or more wavelength ranges to derive relative concentrations of two or more components of the separated petroleum stream that correspond to the two or more wavelength ranges.

2. The method of claim 1, wherein the two or more components and corresponding wavelength ranges are selected from the group consisting of: a saturates component at 125 nm to 160 nm, a one-ring aromatics component at 180 nm to 200 nm, a two-ring aromatics component at 200 nm to 230 nm, and a three-ring aromatics component at 230 nm to 260 nm corresponding a boiling point range of the separated petroleum stream.

3. The method of claim 1, wherein integrating the vacuum ultraviolet signal as a function of boiling point is for a specific boiling point.

4. The method of claim 1, wherein integrating the vacuum ultraviolet signal as a function of boiling point is for a boiling point range.

5. The method of claim 1, further comprising:
    determining a reactivity of the petroleum stream based on the relative concentrations of the two or more components in the separated petroleum stream.

6. The method of claim 1, further comprising:
    determining an oxidation stability of the petroleum stream based on the relative concentrations of the two or more components in the separated petroleum stream.

7. The method of claim 1, further comprising:
    determining a solubility of the petroleum stream in a solvent comprising one or more organic solvents based on the relative concentrations of the two or more components in the separated petroleum stream.

8. The method of claim 1, further comprising:
    determining a solubility of the petroleum stream in a solvent comprising one or more inorganic solvents based on the relative concentrations of the two or more components in the separated petroleum stream.

9. The method of claim 1, further comprising:
    determining a solubility of the petroleum stream in a solvent comprising one or more organic solvents and one or more inorganic solvents based on the relative concentrations of the two or more components in the separated petroleum stream.

10. The method of claim 1, further comprising:
    determining a compatibility of the petroleum stream with other crude oils based on the relative concentrations of the two or more components in the separated petroleum stream.

11. The method of claim 1, further comprising:
    determining a compatibility of the petroleum stream with other refinery streams based on the relative concentrations of the two or more components in the separated petroleum stream.

12. The method of claim 1, further comprising:
    determining a compatibility of the petroleum stream with other crude oils and other refinery streams based on the relative concentrations of the two or more components in the separated petroleum stream.

13. The method of claim 1, further comprising:
    distilling a petroleum feedstock corresponding to the petroleum stream with distillation cut point temperatures based on the relative concentrations of the two or more components in the separated petroleum stream.

14. The method of claim 1, further comprising:
blending a petroleum feedstock corresponding to the petroleum stream with a blending feedstock to achieve a blended petroleum with desired relative concentrations of the two or more components in the separated petroleum stream.

15. The method of claim 1, further comprising:
passing a portion of the separated petroleum stream through one or more additional detectors selected from the group consisting of: a flame ionization detector, a mass spectrometer, an atomic emission detector, a chemiluminescence detector, a photoionization detector, a field ionization mass spectrometer, and an electron impact mass spectrometer.

16. The method of claim 15 further comprising:
correlating a characteristic or property of the separated petroleum stream derived from the one or more additional detectors with the relative concentrations of two or more components of the separated petroleum stream.

17. The method of claim 1, wherein a column of the gas chromatograph comprises one or more polymers selected from the group consisting of: a 5%-phenyl polysilphenylene-siloxane, a phenyl arylene polymer, a 5% phenyl polymer, and a 5%-phenyl methylpolysiloxane.

18. The method of claim 1, wherein the petroleum stream separated as a function of boiling point passes through a transfer line that extends from the gas chromatograph to the vacuum ultraviolet detector.

19. The method of claim 18, wherein the transfer line is maintained at 300° C. to 400° C.

20. A method comprising:
separating the petroleum stream with a gas chromatograph as a function of boiling point;
passing a first portion of the separated petroleum stream through a vacuum ultraviolet detector to yield data comprising a vacuum ultraviolet signal as a function of boiling point;
passing a second portion of the separated petroleum stream through a flame ionization detector (FID) to yield data comprising a FID response as a function of boiling point;
integrating the vacuum ultraviolet signal as a function of boiling point over two or more wavelength ranges to derive relative concentrations of two or more components of the separated petroleum stream that correspond to the two or more wavelength ranges;
integrating the FID response as a function of boiling point over to derive weight percent of the separated petroleum stream as a function of boiling point; and
correlating the relative concentrations of two or more components of the separated petroleum stream with the weight percent of the separated petroleum stream as a function of boiling point.

* * * * *